United States Patent [19]

Messbauer

[11] Patent Number: 4,723,830
[45] Date of Patent: Feb. 9, 1988

[54] OPTICAL FIBER CONNECTORS

[75] Inventor: Frederick B. Messbauer, Rochester, N.Y.

[73] Assignee: Eastman Kodak Company, Rochester, N.Y.

[21] Appl. No.: 623,660

[22] Filed: Jun. 22, 1984

[51] Int. Cl.⁴ .................................................. G02B 6/36
[52] U.S. Cl. ............................. 350/96.20; 350/96.18; 350/96.21
[58] Field of Search ............... 350/96.15, 96.18, 96.20, 350/96.21, 96.22

[56] References Cited

U.S. PATENT DOCUMENTS

| | | | |
|---|---|---|---|
| 3,950,075 | 6/1976 | Cook et al. | 350/96.18 |
| 4,078,852 | 3/1977 | Hawkes et al. | 350/96 C |
| 4,087,155 | 5/1978 | Deacon | 350/96.21 |
| 4,102,559 | 7/1978 | Hunzinger | 350/96 C |
| 4,130,344 | 12/1978 | Lemonde et al. | 350/96.21 |
| 4,183,618 | 1/1980 | Rush et al. | 350/96.18 |
| 4,265,511 | 5/1981 | Nici et al. | 350/96.18 |
| 4,290,667 | 9/1981 | Chown | 350/96.18 |
| 4,378,145 | 3/1983 | Stancati et al. | 350/96.21 |
| 4,420,219 | 12/1983 | Muchel | 350/96.18 |
| 4,421,383 | 12/1983 | Carlsen | 350/96.21 |
| 4,451,115 | 5/1984 | Nicia et al. | 350/96.18 |
| 4,468,087 | 8/1984 | Milan et al. | 350/96.18 |
| 4,497,536 | 2/1985 | Payne et al. | 350/96.21 |
| 4,534,616 | 8/1985 | Bowen et al. | 350/96.20 |

FOREIGN PATENT DOCUMENTS

| | | |
|---|---|---|
| 0053914 | 6/1982 | European Pat. Off. . |
| 100921 | 2/1984 | European Pat. Off. . |
| 1429843 | 3/1976 | United Kingdom . |

Primary Examiner—William L. Sikes
Assistant Examiner—Frank González
Attorney, Agent, or Firm—John B. Turner

[57] ABSTRACT

Connectors for physically and optically connecting optic fibers of the expanded beam type. Each half of the connector includes a lens having a forward surface including a convex portion surrounded by an annular plano portion. Each lens has secured to it a ring member having a circumferential surface coaxial with the lens axis. The lens and ring member are disposed within a tubular member which locates the lens laterally of the axis but gives it small freedom to tilt. The two tubular members are connected by an intermediary member. Biasing means bias the lenses towards one another and hard spheres between the annular plano portions keep their planes parallel.

11 Claims, 5 Drawing Figures

OPTICAL FIBER CONNECTORS

FIELD OF THE INVENTION

This invention relates to connectors for physically and optically connecting optic fibers to one another or to other devices, and to coupling components each forming a part of such a connector.

DESCRIPTION RELEVANT TO THE PRIOR ART

A known type of optic fiber connectors is termed expanded beam connectors, examples of which are described in European Patent Application Publication No. 100,921 and U.S. Pat. No. 4,183,618. In such connectors the light beam emitted from a fiber end is expanded and collimated by a lens and directed at a component which receives the collimated, larger diameter beam and focusses it onto the end of another fiber. Because the beam is of relatively large diameter where it is transferred from one component to another, the task of alignment is reduced as compared to aligning the tiny light-conductive cores of two fibers. Thus, the optical loss in the connector may be reduced. However, even if the expanded beam principle is adopted, it is still important, for reduction of light loss in the connector, that the two components, namely the transmitting and receiving components, be accurately aligned so that the maximum possible amount of light emitted by one fiber end is focussed onto the other fiber end. The task of such alignment may be regarded as having two interrelated aspects, namely the need to gain parallelism of the axes of the transmitting and receiving components and the need to gain coincidence of the axes (i.e. the reduction to zero of the distance between the parallel axes). The former may be regarded as concerning control of the tilt of the axes and the latter may be regarded as concerning the lateral positioning of the axes.

The term parallel, or parallelism, has a dictionary definition of "continuously equidistant" and the distance is a finite value other than zero. As used herein in relation to axes it is intended to cover also the case in which the distance is zero.

Optic fiber connectors not only have to optically couple the fibers but also have to physically couple the outer sheaths of the conductors containing the fibers so that the fibers cannot be physically damaged where exposed in the coupling. These two roles are somewhat in conflict because the physical connection has to be relatively rugged and massive whereas the optical connection is concerned with tolerances in microns and very small angles.

SUMMARY OF THE INVENTION

It is an object of the present invention to give parts of the optical aspect of the coupling some freedom for movement relative to those parts which perform the physical coupling of the conductors. In this way the optical parts can, by mutual cooperation between themselves, gain some of the alignment characteristics without constraint imposed by the rugged physical coupling parts, which constraint could adversely affect the gaining of those alignment characteristics. Because of the partial independence of the lenses to gain some characteristics of alignment independently of the physical coupling components, tolerances in the manufacture of the physical coupling may be relaxed, with resultant economies in manufacturing costs.

The present invention achieves this object by letting the physical coupling parts participate in the location of the axes of the lenses laterally of the axes, but giving the lenses freedom to tilt relative to the physical coupling parts. Also, the lenses cooperate with one another so that parallelism of the axes of the lenses is gained by this cooperation relatively independently of the physical coupling components. Parallelism of the axes of the lenses is achieved by providing lenses each of which has forward and rearward surfaces and a circumferential surface extending between the forward and rearward surfaces. The forward surface includes a convex surface portion surrounded by an annular plano surface portion the plane of which constitutes a datum plane. Spacer means, preferably in the form of three hard spheres, having identical diameters, are placed between the annular plano surfaces of the two lenses and the lenses are resiliently biased towards one another. This achieves parallelism of the datum planes and parallelism of the datum axes, as herein defined. This parallelism can be achieved because the lenses have a small freedom to tilt relative to the physical coupling parts.

The term "datum axis" as herein used is defined as (a) in the case of the convex surface being aspheric, the aspheric axis, (b) in the case of the convex surface being spheric and the rearward surface having a plano operative portion, the line passing through the center of curvature of the spheric surface and perpendicular to the plane of the plano portion of the rearward surface, or (c) in the case of the convex surface being spheric and the rearward surface having a curved operative portion, the line passing through the centers of curvature of the spheric surface portion of the forward surface and of the curved operative portion of the rearward surface.

The lateral positioning of the datum axes, so that they are coincident, is achieved in a simple and effective manner by coaxial cooperating surfaces. The lens, or a ring member provided around the lens, has a cylindrical surface coaxial with the datum axis of the lens. This cylindrical surface cooperates with a cylindrical internal surface on a sleeve member which is part of the physical coupling. The sleeve member has an external cylindrical surface which is coaxial with its cylindrical internal surface. The two external cylindrical surfaces, one on each of the two sleeve members, cooperate with internal cylindrical surfaces of a single intermediary member. The two internal cylindrical surfaces of the intermediary member are coaxial with one another. Thus, the axes of the cylindrical internal surfaces of the two sleeve members are coaxial in a complete coupling.

The cylindrical region of contact between the cylindrical surface of the lens, or the ring member around the lens, and the cylindrical internal surface of the sleeve member locates the lens, or lens and ring member, relative to the sleeve member laterally of the datum axis, by virtue of the contact. However, the short axial extent of the contact allows the lens, or lens and ring member, to tilt by a small amount within the sleeve member, i.e, the datum axis has small freedom to tilt relative to the axes of the cylindrical surface of the sleeve member. In this way, an effective lateral location with freedom to tilt is achieved in a simple and effective manner.

The physical coupling is completed by two collar nuts, one cooperating with each of the sleeve members, and both threadedly engaged with the intermediary member. In this way, the two coupling compnents, including lens, sleeve member and collar nut, associated with the ends of conductors to be joined, are identical and can be joined by the intermediary member. This avoids problems encountered when non-identical, e.g. male and female, components are used, such as occur when it happens that two male or two female components have to be connected.

The resilient bias of the two lenses towards one another is achieved in a simple, convenient and economical manner by resilient O-rings acting between the sleeve member and the lens of each coupling component.

The association of a ring member with the lens has advantages in that the required cylindrical surface is more economically formable as part of a molding process forming the ring member, than it is to form it on the lens itself.

Conveniently, the spacer means in the form of hard spheres, between the annular plano surfaces of the lenses, are carried in a cage. In order to avoid adverse influence by the cage on the alignment of the lenses, the cage is formed from thin flexible plastic material as a continuous annulus with lobes carrying the spheres. The construction is such that while the spheres are constrained against movement relative to one another radially and circumferentially of the axis, the forces the cage exerts on the lenses through the spheres are negligible.

For best performance of the connector, the end of a fiber has to be accurately positioned relative to the convex surface of the lens. This accurate positioning, having been determined using test apparatus, is maintained by transparent cement having a refractive index corresponding to that of the lens.

Inventive features which contribute to the advantages discussed above may be adopted with advantage in a coupling component for coupling an optic fiber to a device, such as a terminal.

DESCRIPTION OF THE DRAWINGS

A preferred embodiment of the present invention will now be described, by way of example, with reference being made to the accompanying drawings in which.

DETAILED DESCRIPTION OF PREFERRED EMBODIMENTS

Figure 1:
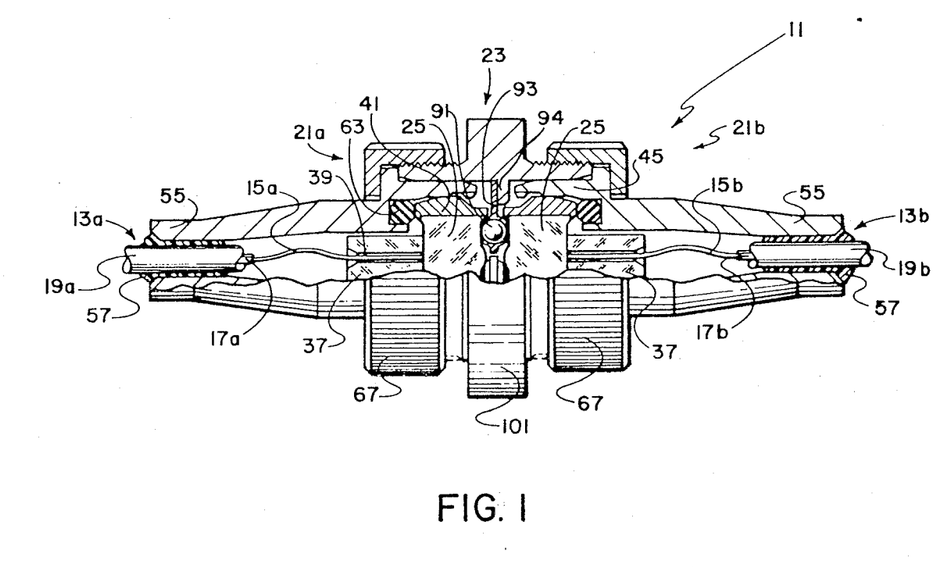
FIG. 1 is an elevational view, partially broken away for the sake of understanding, of a fiber connector embodying the present invention.

Illustrated in FIG. 1 of the drawings is a connector 11 optically coupling two optical fiber conductors 13a, 13b. Each conductor 13a, 13b, comprises an optical fiber 15a, 15b surrounded by a buffer 17a, 17b in turn surrounded by a sheath 19a, 19b, in known manner. End portions of the fibers 15a, 15b are bared for connection.

The connector 11 comprises two identical coupling components 21a, 21b and an intermediary member 23. As the coupling components are identical a description of one will suffice.

The coupling component 21a includes lens means including a lens 25 formed of a refractive material, in the present embodiment, glass, and having a rearward surface, which is substantially plano in at least an operative central region 27, and a forward surface 29. The forward surface 29 has a convex surface portion 31 which in the present embodiment is spheric. In other embodiments the portion 31 is aspheric. The portion 31 is surrounded by a plano annular portion 33 to which the rearward plano surface region 27 is substantially parallel. The plane of the plano annular portion 33 is termed the datum plane. A datum axis 34 in the present embodiment, in accordance with the definition given above, is the line passing through the center of crvature of the spheric surace and perpendiclar to the plane of the plano central region 27 of the rearward surface. Thus, the aspheric surface constitutes means defining the datum axis. The datum axis and datum plane are perpendicular. A circumferential surface 35 extends between the forward and rearward surfaces and, in the present embodiment, is of generally circular cylindrical shape having an axis approximately coaxial with the datum axis 34. Abutting the rearward plano surface region 27 of the lens 25 is a tubular element 37 formed, in the present embodiment, of glass transparent to ultraviolet light, and having an axial bore 39 in which is disposed a bared end portion of the fiber 15a. For the purpose of illustration, the bore 39 is shown with a diameter much greater than that of the fiber. This is not the case in reality. For example, the bore may have a 0.017 cm diameter and the fiber may have a 0.012 cm diameter. The end of the fiber is in contact with the lens. The end portion of the fiber, the tubular element 37 and the lens are bonded together by cement 40 having a refractive index matching that of the glass of the lens. The location of the end of the fiber relative to the convex surface portion 31 is such that light emitted from the fiber end is transmitted from the convex surface portion in a collimated beam having a diameter larger than that of the fiber and having its axis parallel to the datum axis. The technique for achieving this important condition involves moving the location of the end of the fiber, in contact with the lens, until a test apparatus shows that light emitted by the fiber end is transmitted by the convex surface portion as a collimated beam with the aforesaid desired orientation of the axis of the beam. When this condition is achieved, ultraviolet light is applied to the uncured cement around the fiber end, the cement being of a type curable by ultraviolet light.

The forward surface of the lens has an anti-reflection coating.

The lens means also includes ring member 41 which is fixedly disposed around the circumferential surface of the lens and is secured to the lens so that relative movement of the ring member and the lens is prevented. The ring member is formed of plastics material and is molded in situ onto the lens. The ring member 41 has an outer surface 43 of circular cylindrical shape, the orientation of the axis of which is coaxial with the datum axis. Thus, whatever may be the shape of the circumferential surface 35 of the lens, the ring member 41 provides a surface, the surface 43, which is cylindrical and coaxial with of the datum axis.

The lens means, consisting of the lens 25 and the ring member 41, is disposed radially within a sleeve-like end portion 45 of a tubular member 47. The portion 45 has a circular cylindrical inner surface 49 which is in mating telescopic relationship with the surface 43 of the ring member over a cylindrical region of short axial length. Movement of the ring member 41 out of the end portion 45 of the tubular member (to the right as seen in FIG. 1), is prevented by inwardly directed resiliently mounted teeth 51 on the tubular member.

The end portion 45 of the tubular member 47 has a circular cylindrical external surface 53 coaxial with its inner surface 49.

End portion 55 of the tubular member 47 remote from its end portion 45, is formed to allow physical connection between the tubular member 47 and the sheath 19a or 19b of the conductor. In the present embodiment the physical connection is achieved by mastic 57, but it may also be achieved in other ways, for example, by a resilient or split collar compressible or deformable by a nut threadedly engaged with the tubular member.

The tubular member 47 has a forwardly facing annular recess 59 the bottom of which is formed by a forwardly facing annular shoulder 61. Disposed in the recess 59 is an O-ring 63 of resilient material. A rearwardly facing annular surface 65 on the ring member 41 faces the O-ring 63.

Each coupling component 21a, 21b also includes a collar nut 67 having a forwardly facing annular surface 69 engageable with a rearwardly facing annular surface 71 on the tubular member 47. The collar nut 67 has internal threads 73.

The two coupling components 21a, 21b are physically connected by the intermediary member 23 which has inner cylindrical surfaces 75 for mating telescopic engagement with the external surfaces 53 of the tubular members 47. The intermediary member 23 also has external threads 77 for cooperation with the internal threads 73 of the collar nuts 67.

Figure 2:
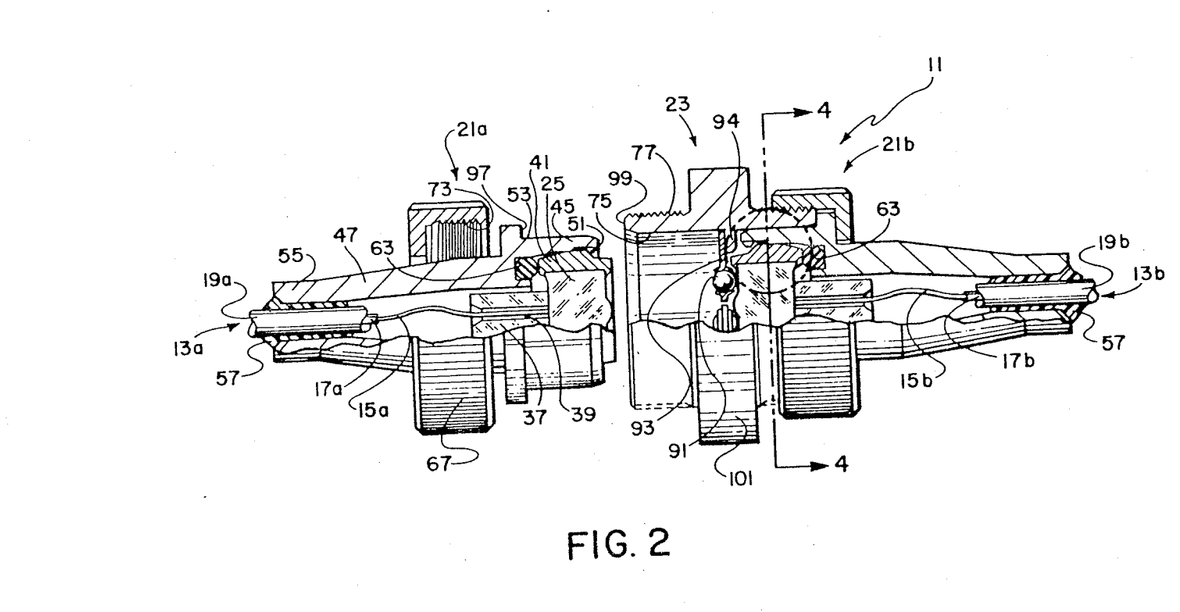
FIG. 2 is a view similar to FIG. 1, but with parts of the connector spaced away from one another prior to effecting the connection of the optical fibers.

The coupling components 21a, 21b can be drawn towards one another by rotation of the collar nuts 67 relative to the intermediary member 23 when the threads 73 and 77 are engaged with one another.

Figure 4:
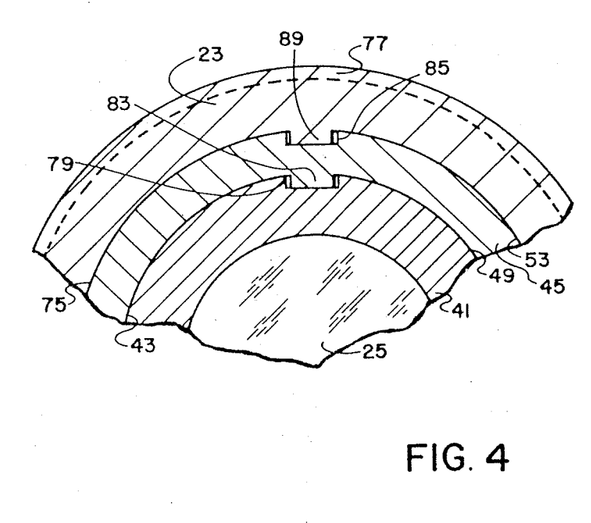
FIG. 4 is a partial section taken on line 4—4 in FIG. 2 showing keys and keyways.
Figure 5:
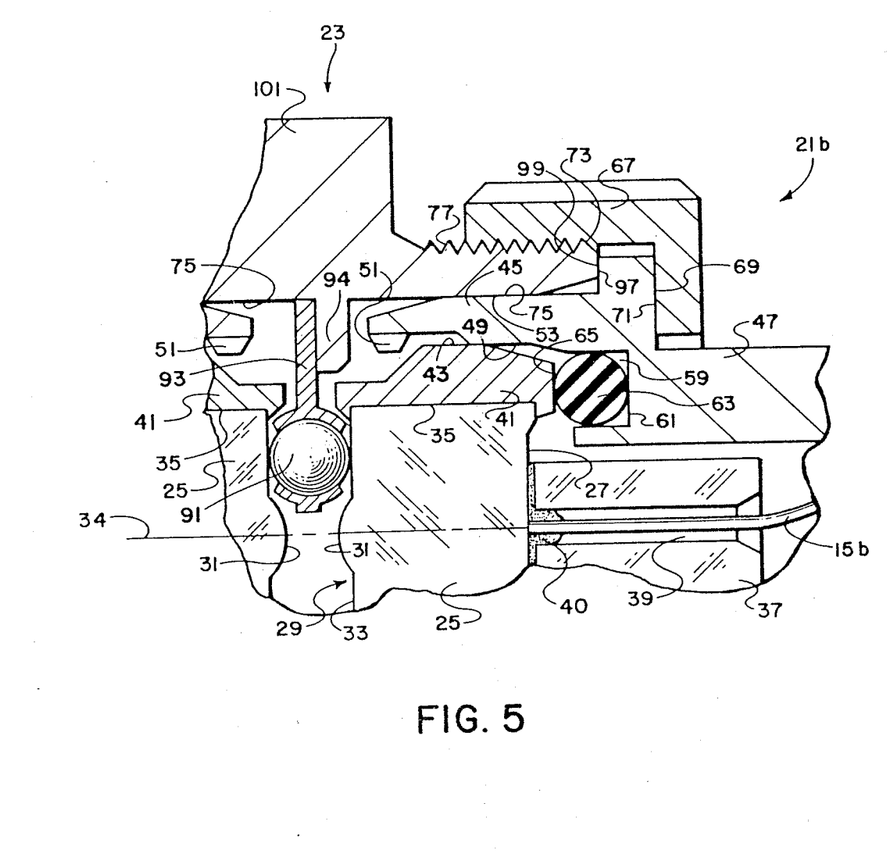
FIG. 5 is an enlarged section of a portion of the connector illustrated in FIG. 1.

The outer surface 43 of the ring member 41 has a keyway 79 and the inner surface 49 of the tubular member 47 has a key 83 extending into the keyway 79, see FIG. 4. The external surface 53 of the tubular member 47 has a keyway 85 and the inner surface 75 of the intermediary member 23 has a key 89 extending into the keyway 85. The keys and keyways are axially extensive allowing relative axial movement of the ring member, tubular member and intermediary member, but are so formed as to prevent relative rotational movement about the datum axis, of the ring member, tubular member and intermediary member. Thus, the angular orientation of the fibers relative to one another is controlled once they have been cemented to their respective lens members.

Figure 3:
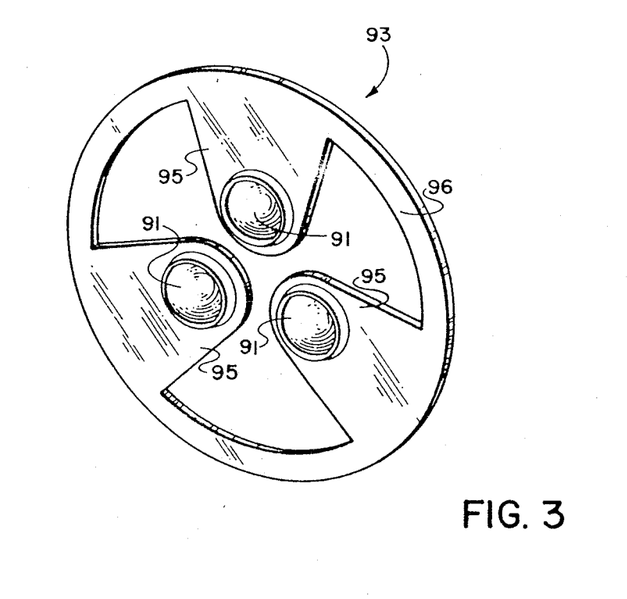
FIG. 3 is a perspective view of spacer means included in the connector illustrated in FIGS. 1 and 2.

The plano annular portions 33 of the forward surfaces of the lenses are held apart in parallel, spaced relationship (i.e., the datum planes are held parallel) by spacer means including three spheres 91 of incompressible material, in the present example, steel, having substantially identical diameters. The spheres 91 are retained in a cage 93 formed of thin flexible plastic material, and are in mutually spaced disposition about the datum axis. In in the present embodiment they are at 120° to one another. The cage 93 includes a continuous annulus 96 and three lobes 95 extending radially inwards from, and integral with, the annulus. The external diameter of the annulus is such that the cage fits with minimal play within one of the cylindrical surfaces 75 of the intermediary member 23. The cage is located axially within the intermediary member 23 by abutting against an annular rib 94. The cage resists movement of the spheres radially relative to the datum axis and circumferentially about the datum axis. However, the cage imposes minimal opposition to movement of the spheres axially, with respect to the remainder of the coupling, out of their positions when the cage is unflexed. The minimization of the axially directed forces applied by the cage on the spheres minimizes any influence the cage might have on one or the other (or both assymmetrically) of the lens means.

As described above, appropriate rotation of the collar nuts 67 draws the lens means towards one another. The approach of the lens means towards one another is terminated when the forward surfaces of the lenses contact all spheres. Further rotation of the collar nuts causes compression of the O-rings 63. Compression of the O-rings is limited by engagement of annular shoulders 97 on the tubular member 47 with end surfaces 99 of the intermediary member. Any further rotation of the collar nuts 67 after engagement of the shoulders 97 with the surfaces 99 serves to put the threads 73 and 79 under stress thereby locking the collar nuts with the intermediary member so that the connector does not unintentionally come apart.

The intermediary member 23 is, for the purpose of illustration, shown with an enlarged central portion 101. This central portion may take any convenient form such as a flange for mounting on a panel or for connection to flanges of other similar connectors. Also, it may be provided with a tool-engaging surface, such as a hexagonal surface for cooperation with a wrench.

It is stated above that the axial extent of the cylindrical region of contact of the outer surface 43 of the ring member 41 with the inner surface 49 of the tubular member is small. As an example, the aforesaid axial extent may be 0.050 to 0.075 cm in an embodiment in which the thickness of each lens is 0.5 cm, and the diameter of the cylindrical outer surface 43 of the ring member is 1 cm. The axial extent of the region of contact is short in order to minimize any influence which the tubular member might exert, through such contact, which might tend to destroy parallelism of the datum axes. The region of contact, with small axial extent, might be likened to a gimbal. The contact locates the datum axis laterally within the sleeve member. Thus, the short axial extent of the region of contact allows small freedom of the datum axis to tilt relative to the sleeve member.

The use of the steel spheres 91, often termed microspheres, to maintain the parallelism of the datum planes, with the lens means being resiliently biased towards one another by the compressed O-rings 63, has advantages because they are readily available with high accuracy of diameter at economical price.

The intermediary member and tubular members are molded from plastics material.

The ring member 41 allows the creation of a desired cylindrical surface coaxial with the datum axis by molding techniques and does not require the creation on the lens of a circumferential surface which both is accurately cylindrical and has an axis coaxial with the datum axis.

It will have been realized that parallelism of the datum planes is achieved by the spheres 91, the plano annular surface portions 33 and the resilient O-rings 63. Coincidence of the parallel datum axes is achieved by making the circular cylindrical surfaces 43, 53, 49 coaxial.

In the embodiment described above, the cage 93 for the spheres 91 is an element separate from the intermediary member. However, the cage may be molded integrally with the intermediary member 23 and in such case the rib 94 would be omitted.

The invention has been described above in an embodiment which is a connector for optically coupling two optical fibers. A coupling component in accordance with the present invention may be used for optically coupling an optical fiber to another device, such as a terminal device. In such an embodiment a single coupling component, such as is described above, would be physically connectible to the other device which would have a plano surface corresponding in function to the plano annular surface 33. Spacer means, such as spheres 91 and cage 93, would be interposed between the plano annular surface 33 of the coupling component and the corresponding plano surface of the device. The device would have a cylindrical surface, coaxial with a datum axis of the device, for direct or indirect cooperation with a cylindrical surface on the coupling component, such as surface 53. Preferably, the light source or receiver of the device would be mounted in the device in a manner similar to that in which the lens 25 and its ring member 41 is mounted in the tubular member as described above.

In the embodiment particularly described above, the two coupling components are both male and there is an intermediary member which is female at both ends. In another embodiment of the present invention one coupling component may be male and the other may be female. In this case there need be no intermediary member. In order to achieve the necessary coaxial relationship of the two components in the assembled condition, the tubular member of the female would have a circular cylindrical internal surface, coaxial with the datum axis, which would extend forwardly and mate with the circular cylindrical external surface of the tubular member of the male component.

In the embodiments specifically described above, there are surfaces which are described as cylindrical internal surfaces. Those skilled in the art of molding plastic parts will readily recognize that the forming of such surfaces may be difficult. They will recognize that the effect of such surfaces may be created by a plurality of flat surfaces, tangential to the cylindrical surface desired. Accordingly, reference in the preceding description and ensuing claims to cylindrical surfaces is to be understood as including slightly conical (draft) surfaces, interrupted cylindrical surfaces and theoretical cylindrical surfaces defined by a plurality of other, e.g. flat, surfaces tangential to the theoretical cylindrical surface.

I claim

1. A coupling component for use in coupling an optical fiber to a device having a cylindrical alignment surface and a forward plano surface, said component comprising
    lens means including a lens having forward and rearward surfaces;
    said forward surface having a convex portion surrounded by an annular plano portion;
    means for defining a datum axis, the plane of said annular plano portion being perpendicular to said datum axis;
    said lens means having a cylindrical outer surface coaxial with said datum axis;
    a sleeve member disposed about the cylindrical outer surface of said lens means and having first and second coaxial cylindrical surfaces, the first cylindrical surface of said sleeve member being an internal surface and arranged to engage said cylindrical outer surface of said lens means in a region of short axial length, whereby the cooperation of the sleeve member with the lens means locates said datum axis laterally within said sleeve member while allowing small freedom of the datum axis to tilt relative to the sleeve member; and
    means for securing an optical fiber to the rearward surface of the lens member with the end of the fiber in contact with said rearward surface, such that light emitted from the fiber is transmitted by the convex surface portion in a collimated beam of a width greater than the width of the fiber and with the axis of the collimated beam parallel to said datum axis.

2. A couling component as claimed in claim 1, wherein
    said lens has a circumferential surface extending between said forward and rearward surfaces; and
    said lens means further includes a ring member disposed about the circumferential surface of, and secured to, the lens, the said cylindrical outer surface of the lens means being a surface of the ring member.

3. A coupling component as claimed in claim 1, further including
    three spheres of incompressible material for location against the annular plano portion of the forward surface of the lens in mutually spaced disposition about the datum axis for cooperation with the forward plano surface of said device.

4. A coupling component as claimed in claim 3, further including
    a cage for said spheres, said cage restraining the spheres against movement radially and circumferentially of said datum axis but imposing minimal restraint against movement parallel to said datum axis.

5. A coupling component as claimed in claim 1, 2, 3 or 4, wherein
    the second coaxial cylindrical surface of the sleeve member is an external cylindrical surface; and
    the cylindrical alignment surface of said device is an internal cylindrical surface of a tubular portion of the device;
    said coupling component further including means for securing the sleeve member to said device including a collar nut cooperating with the sleeve member and a threaded external surface of the tubular portion.

6. A coupling component as claimed in claim 1, wherein
    the sleeve member has a forwardly facing annular shoulder, and
    the lens means has a rearwardly facing annular shoulder facing the annular shoulder of the sleeve member, said coupling component further including
    biasing means for biasing the lens means forwardly relative to the sleeve member, including an O-ring of resilient material disposed between the annular shoulders.

7. A connector for coupling two optical fibers, the connector including
   two coupling components and
   an intermediary member of tubular form for and connecting the two coupling components;
   each of said coupling components including
      a lens having forward and rearward surfaces and a circumferential surface between the forward and rearward surfaces,
      the forward surface having a convex surface portion surrounded by an annular plano portion;
      means for defining a datum axis, the plane of said annular plano portion being perpendicular to said datum axis and constituting a datum plane;
      a ring member disposed about the circumferential surface of, and secured to, the lens and having a circular cylindrical outer surface coaxial with the datum axis;
      a sleeve member disposed about the circular cylindrical outer surface of the ring member and having an inner circular cylindrical surface in contact with said circular cylindrical outer surface in a cylindrical region of short axial length;
      biasing means for biasing the lens and ring member forwardly relative to the sleeve member;
      means for securing an optical fiber to the rearward surface of the lens such that light emitted from the fiber is transmitted by the convex surface portion in a collimated beam of a width greater than the width of the fiber and with its axis parallel to said datum axis, and
      connecting means for cooperation with said intermediary member for connecting the component to the intermediary member,
   said intermediary member having cooperating means for cooperating with each of the connecting means of the two coupling components,
   said intermediary member further including:
      spacer means for maintaining the two datum planes parallel and spaced when said lenses are biased towards one another by said biasing means, said spacer means including three spheres of incompressible material and a cage for retaining said spheres and opposing movement of the spheres relative to one another and to the intermediary member radially of said datum axes and circumferentially of said datum axes, but imposing minimal opposition to movement relative to one another parallel to said datum axes,
   the cooperation of the intermediary member with the two coupling components and the contact between the sleeve members and the ring members serving to prevent movement of the two datum axes relative to one another radially of the datum axes, the short axial length of the said cylindrical region of contact of the said inner circular cylindrical surface of the sleeve member with the circular cylindrical outer surface of the ring member of each coupling component allowing the lens small freedom to tilt relative to the sleeve member.

8. A connector as claimed in claim 7, wherein
   the two coupling components are identical and wherein
   said cooperating means of said intermediary member includes identical means at the opposite ends of the intermediary member for cooperation with the connecting means of the identical coupling components.

9. A connector for coupling two optic fibers, including
   two lenses each having forward and rearward surfaces, each forward surface having a convex surface portion surrounded by an annular plano portion, the plane of the plano portion constituting a datum plane, each rearward surface being adapted to be contacted by an end of an otic fiber;
   means for defining in each lens a datum axis perpendicular to said datum plane;
   means for biasing the lenses toward one another with their forward surfaces facing one another; and
   spacer means between the annular plano portions of said forward surfaces maintaining the datum planes parallel, whereby the datum axes are parallel, said spacer means including three spheres of incompressible material dispersed about the datm axes.

10. A connector for coupling two optical fibers, including
    two lenses each having forward and rearward surfaces, each forward surface having a convex surface portion surrounded by an annular plano portion, the plane of the plano portion constituting a datum plane, each rearward surface being adapted to be contacted by an end of an optic fiber;
    means for defining in each lens a datum axis perpendicular to said datum plane;
    means for biasing the lenses toward one another with their forward surfaces facing one another;
    spacer means between the annular plano portions of said forward surfaces maintaining the datum planes parallel, whereby the datum axes are parallel; and
    means cooperating with both the lenses for preventing movement of each lens laterally of its said datum axis and for allowing each lens a small degree of movement resulting in tilt of its said datum axis.

11. A connector as claimed in claim 10, wherein:
    said spacer means includes three spheres of incompressible material dispersed about the datum axes.

* * * * *

UNITED STATES PATENT OFFICE
CERTIFICATE OF CORRECTION

PATENT NO. : 4,723,830
DATED : February 9, 1988
INVENTOR(S) : Frederick B. Messbauer It is certified that error appears in the above-identified patent and that said Letters Patent are hereby corrected as shown below:

Col. 2, line 68 "compnents" should be --components--.

Col. 3, line 45, after "fiber", insert --optical--.

Col. 4, line 14, "crvature" should be --curvature--.

Col. 4, line 15, "surace" should be --surface--.

Col. 5, line 62, delete "in".

Col. 8, line 22, claim 2, "couling" should be --coupling--.

Col. 9, line 4, after "for" delete --and--.

Col. 10, line 21, "otic" should be --optic--.

Signed and Sealed this

Twelfth Day of July, 1988

Attest:

DONALD J. QUIGG

Attesting Officer

Commissioner of Patents and Trademarks